United States Patent
Nankivell, Jr. et al.

[11] 3,832,747
[45] Sept. 3, 1974

[54] BOLT AND METHOD OF MAKING THE SAME

[75] Inventors: Erby Roy Nankivell, Jr.; James H. Turner, both of Athens, Tenn.

[73] Assignee: Plastic Industries, Inc., Athens, Tenn.

[22] Filed: Feb. 24, 1970

[21] Appl. No.: 13,571

Related U.S. Application Data
[63] Continuation-in-part of Ser. No. 671,433, Sept. 28, 1967, abandoned.

[52] U.S. Cl. .............................................. 10/27 R
[51] Int. Cl. ..................... B21k 1/44, B23g 9/00
[58] Field of Search ................. 10/11, 27, 86, 86 C; 29/510, 517; 85/9

[56] References Cited
UNITED STATES PATENTS

| | | | |
|---|---|---|---|
| 94,276 | 8/1869 | Bell | 10/27 |
| 172,459 | 1/1876 | Lewis | 10/27 |
| 253,494 | 2/1882 | Babcock | 10/27 |
| 512,622 | 1/1894 | McGill | 10/86 C |
| 1,346,058 | 7/1920 | Robergel | 85/9 |
| 1,450,583 | 4/1923 | Ferry | 10/86 C |
| 1,742,201 | 1/1930 | Drissner | 10/27 |
| 1,765,516 | 6/1930 | Whitney | 10/27 |
| 2,366,459 | 1/1945 | Rosa | 85/9 |
| 2,397,076 | 3/1946 | Keller et al. | 29/510 |
| 2,541,790 | 2/1951 | Sugden et al. | 85/9 |

FOREIGN PATENTS OR APPLICATIONS
| | | | |
|---|---|---|---|
| 503,017 | 8/1919 | France | 10/27 |

*Primary Examiner*—Charles W. Lanham
*Assistant Examiner*—E. M. Combs
*Attorney, Agent, or Firm*—Stowell & Stowell

[57] ABSTRACT

A shank, similar to the shank of a bolt and straight from end to end, is threaded along one end and has its other end knurled or otherwise processed to disturb the surface continuity of the metal, thus providing an irregular surface. A head having a shoulder portion provided with an axial opening is then pushed downwardly into position over the knurled end of the shank. Inward radial pressure is then exerted on the shoulder portions of the shank to cause the metal around the axial opening thereof to be displaced or flow into the adjacent irregularities of the shank. This permanently secures the head to the shank, just as if the two had been integrally formed. The inward radial pressure exerted against the shoulder of the head not only permanently unites the shoulder with the shank but also shapes the shoulder in accordance with any desired cross-sectional shape thereof, such as square, hexagonal, etc.

1 Claim, 8 Drawing Figures

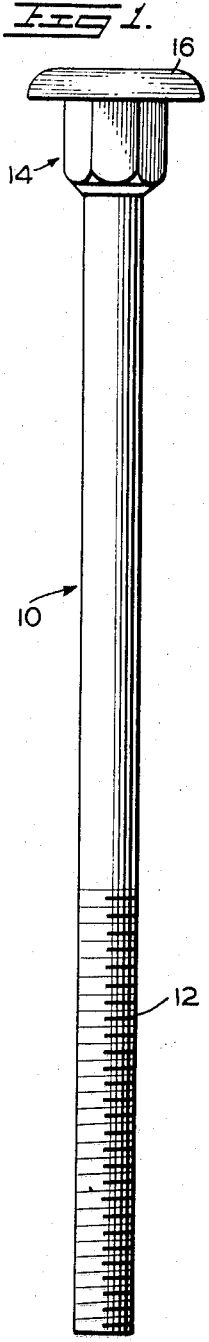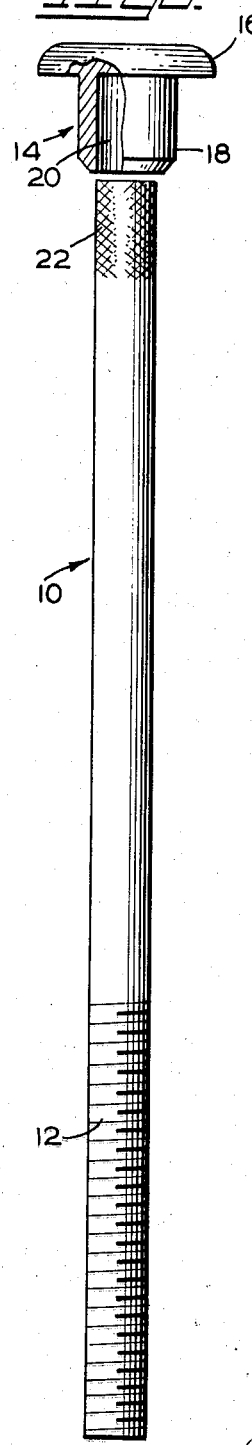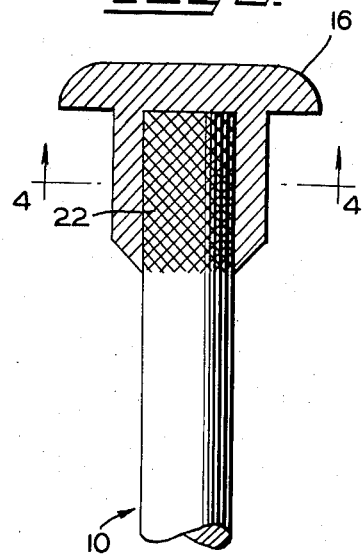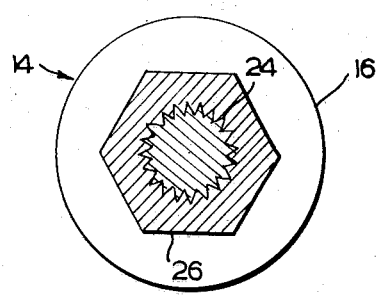

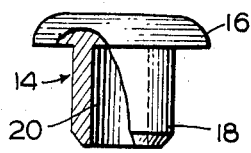
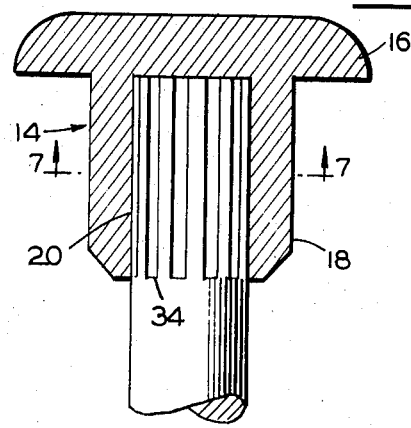
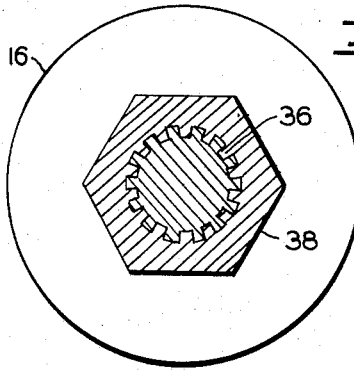
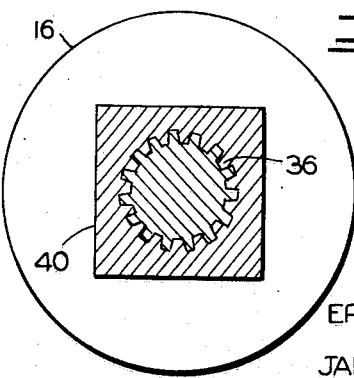
INVENTOR
ERBY ROY NANKIVELL, JR
JAMES H. TURNER
BY Stowell & Stowell
ATTORNEY

BOLT AND METHOD OF MAKING THE SAME

BACKGROUND OF THE INVENTION

This application is a continuation-in-part of application Ser. No. 671,433, filed Sept. 28, 1967, now abandoned.

The invention relates to the field of bolts of various kinds, the cost of manufacture of which is relatively high in the larger sizes of the bolts. Moreover, the necessity for the making of bolts with heads of different cross-sectional shapes requires the stocking of a large number of bolts, thus making any given size and shape of bolt relatively expensive to purchase.

Previously it has been the practice to cold-press one end of a shank to form heads of the desired shape and this is relatively expensive where steel bolt shanks are employed.

SUMMARY OF THE INVENTION

Steel rod material is cut to the desired length according to the length of the finished bolt to be made. One end of the shank is threaded for the reception of a suitable nut forming no part of the present invention. The outer surface of the other end of the shank or stud of the bolt is then roughened in any suitable manner as by knurling, fluting, etc., to provide the head end of the bolt with roughness including depressions preferably entirely around the shank. A bolt head is formed by die-casting a malleable metal such as zinc base die-casting alloy SEA 925 or other zinc, aluminum, copper or iron containing die-casting alloys. This head is suitably formed with an upper annular flange and a depending shoulder, which may be of circular cross-section, with an axial relatively deep recess extending into the lower end thereof of a diameter approximately equal to the diameter of the stud or shank.

In accordance with the practice of the method, the head is moved downwardly so that the roughened end of the shank enters fully into the axial opening in the head. The head is then subjected to radially inward forces externally applied to displace the metal of the shoulder radially inwardly and thus cause some of the metal surrounding the axial opening to enter the depressions in the roughened portion of the shank. The metal of the head will accommodate itself to the knurling, fluting or any other type of roughening employed and the head becomes permanently attached to the shank of the bolt by this action. Without welding or any other type of attachment.

Many bolts, for example, carriage bolts, are provided with shoulders of polygonal cross-section. The inward displacing of the shoulder of the head to cause its attachment to the shank of the bolt may be accomplished by a forming device which will shape the shoulder of the head to the desired cross-section, for example, square or hexagonal.

BRIEF DESCRIPTION OF THE DRAWINGS

FIG. 1 is a side elevation of a bolt formed in accordance with the invention, the nut being omitted;

FIG. 2 is a side elevation of the bolt stud or shank prepared for attachment to the head, the latter being shown in position ready for movement into engagement with the shank;

FIG. 3 is an enlarged fragmentary sectional view of the upper end of a finished bolt taken diametrically thereof;

FIG. 4 is a section on line 4—4 of FIG. 3;

FIG. 5 is a view similar to FIG. 2 showing a modified form of the invention;

FIG. 6 is a fragmentary assembled view of the upper end of the bolt formed in accordance with FIG. 5;

FIG. 7 is a section on line 7—7 of FIG. 6 showing the shoulder of the bolt head hexagonal in cross-section; and FIG. 8 is a similar view showing the shoulder of the head square in cross-section.

DESCRIPTION OF THE PREFERRED EMBODIMENTS

Referring to FIGS. 1 to 4, inclusive, the numeral 10 designates a bolt stud or shank preferably formed of steel stock, cut to the desired length and threaded along one end as at 12 to receive the conventional nut (not shown). Instead of cold-forming a head on the upper end of the shank 10, integral therewith, the present invention contemplates the formation of a separate head 14 of any desired material, as suggested above. This head is initially formed, as shown in FIG. 2, having an upper annular overhanging flange 16 and a dependent skirt or shoulder 18 provided with an axial recess 20 of substantial length opening into the lower end of the shoulder 18.

The surface continuity of the upper end of the shank 10 is disrupted, in the present instance, by knurling indicated by the numeral 22.

The axial recess 20 corresponds in shape and approximately in diameter to the shank 10 and is positioned, as shown in FIG. 2, ready for assembly to complete the bolt. The upper end of the shank enters wholly into the recess 22, as shown in FIG. 3, whereupon external, inwardly acting force is applied against the shoulder 18 to deform the metal of the shoulder and cause the metal around the hole or recess 20 to flow into the depressions formed by the knurling 22, as indicated in somewhat exaggerated form by the numeral 24 in FIG. 4. Thus, the head 14 becomes permanently attached to the shank 10, the connection being just as rigid as is true of a bolt made with an integral head.

In applying the external force to the shoulder 18 to attach it to the shank, such force provides the second and simultaneous result of shaping the shoulder 18 cross sectionally as may be desired, for example, hexagonally, as at 26 in FIG. 4. In other words, the application of the external force effects the permanent attachment of the head of the bolt to the shank and determines the cross-sectional shape of the shoulder of the finished bolt.

In FIGS. 5 to 8, inclusive, a modified form of the invention is shown in which shank 30, similar to the shank 10, is threaded at its lower end as at 32 for reception in the usual nut (not shown). In this case, the upper end of the shank 30 is fluted in any suitable manner as at 34 to provide a different type of surface roughness for the attachment of the bolt head. In this case the bolt head may be identical with that shown in FIG. 2 and has been indicated by the same reference numerals. In assembling, the head 14 in FIG. 5 is pushed axially downwardly to assemble the fluted shank end 34, as shown in FIG. 6. In each form of the invention, the lower end of the shoulder 18 preferably covers whatever type of surface roughening that has been employed on the shank so that such roughening is not visible in the finished product.

With the parts assembled, as in FIG. 6, the same external force may be applied to the shoulder 18 as in the previously described case not only to deform the material of the head to cause it to flow into the grooves of the fluting 34, as at 36 but to utilize the external force to shape the shoulder 18 into hexagonal form. The same result takes place in the form of the invention in FIG. 8 except that the shoulder 18 is deformed into square shape as at 40.

From the foregoing, it will be apparent that the present method is economical in producing bolts, and particularly longer, usually relatively expensive bolts. The heads may be die-case of any desired metal. These heads may be produced rapidly in quantities for ready attachment to the bolt shanks and the single method step of applying external forces to the shoulder of the head effects the permanent attachment of the head to the shank and shapes the shoulder to any desired cross-sectional form, according to the use to which the bolt is to be put.

The invention also contemplates the highly useful and economical product wherein the head of the bolt is unitary but not integral with the shank and may be of any desired material according to the use to which the bolt is to be put, with the particular purpose of reducing the cost of the bolt by the use of materials of lower cost in the making of the bolt heads.

We claim:

1. The method of making on a custom basis a malleable metal headed steel bolt of any desired length and size which comprises:
    1. cutting a straight bolt shank to the desired length from steel round rod material with the bolt shank having opposing end portions;
    2. threading one end portion of the bolt shank;
    3. disrupting the peripheral surface of the other end portion of the bolt shank;
    4. die-casting a bolt head from a die-casting malleable metal; the die cast bolt head having a finished head and a shoulder portion of circular cross section and provided with an axial recess of a cross sectional size to snugly receive the disrupted end portion of the bolt shank;
    5. applying equal radially inward force against the entire outer peripheral surface of the shoulder portion of the head to cause the metal of the recess wall thereof to flow into the adjacent surface disruptions of the shank end portion and thus permanently fix the head to the said end portion of the bolt shank and to simultaneously alter the outer peripheral shoulder configuration in to a polygonal cross sectional shape thereby causing the die casting metal of the shoulder to flow into the surface irregularities of the shank end portion of the bolt.

* * * * *